United States Patent [19]

Sugimoto et al.

[11] Patent Number: 5,636,128
[45] Date of Patent: Jun. 3, 1997

[54] APPARATUS FOR DETECTING PERIODICITY IN TIME-SERIES DATA

[75] Inventors: Miyuki Sugimoto; Masako Nakajima; Koichi Murakami, all of Kawasaki, Japan

[73] Assignee: Fujitsu Limited, Kawasaki, Japan

[21] Appl. No.: 311,038

[22] Filed: Sep. 26, 1994

[30] Foreign Application Priority Data

Sep. 24, 1993 [JP] Japan .................................. 5-237551

[51] Int. Cl.⁶ .................................................. G06F 19/00
[52] U.S. Cl. .................................................. 364/487
[58] Field of Search ........................... 395/550; 364/487, 364/550, 569

[56] References Cited

U.S. PATENT DOCUMENTS

| | | | |
|---|---|---|---|
| 4,559,602 | 12/1985 | Bates, Jr. ................................ | 364/487 |
| 5,113,339 | 5/1992 | Komatsu et al. ....................... | 395/200 |
| 5,170,359 | 12/1992 | Sax et al. .............................. | 364/487 X |

*Primary Examiner*—Thomas M. Heckler
*Attorney, Agent, or Firm*—Staas & Halsey

[57] ABSTRACT

An apparatus for detecting periodicity in time-series data, which is to be processed, includes a specifying unit for designating positions of coordinates in n-dimensional phase space, which are indicated by incoming time-series data and time-series data of the number n−1 that have been already input, arranged in series with the incoming time-series data; an extraction unit for estimating the frequency of emergence in the positions of the coordinates, by taking into consideration a fluctuation in the time-series data, and extracting at least one characteristic point from the coordinates on the basis of the frequency of emergence; a detection unit for checking whether or not the characteristic point at the start point extracted by the extraction unit conforms to the characteristic point at the end point, and detecting periodicity information about the periodicity formed by every characteristic point extracted by the extraction unit; and an output unit for determining the periodicity in the time-series data on the basis of the thus detected periodicity information.

20 Claims, 9 Drawing Sheets

APPARATUS FOR DETECTING PERIODICITY IN TIME-SERIES DATA

BACKGROUND OF THE INVENTION

1. Field of the Invention

The present invention relates to an apparatus for detecting periodicity in time-series data, which is constituted by a plurality of discrete time periods and which is to be processed.

More specifically, the present invention relates to an apparatus for detecting periodicity information about the periodicity in time-series data which includes plural kinds of of time periods in an arbitrary data format, e.g., information about some rhythm patterns included in sound signals of music, in accordance with a simplified operating process, by means of a computer system.

Recently, in many fields in which various kinds of signals for transferring time-series data are handled, it has become necessary to accurately process the above-mentioned time-series data in a relatively short time, e.g., in real time. Typically, in the case where a certain music played by a man is to be analyzed in real time by utilizing a computer system, so that a smooth communication between a man and a computer system can be realized, the computer system is required to listen to the music and to rapidly extract some rhythm patterns included in sound signals constituting the music.

To satisfy such a requirement, it is essential to rapidly detect periodicity information about the periodicity in time-series data, and to understand what kinds of elements the signals which are to be processed include, by utilizing a computer system.

Namely, to satisfy the above-mentioned requirement, it is desirable to establish a configuration in which a process for detecting periodicity information about the periodicity in time-series data can be easily executed without the necessity for presupposing the data format of the time-series data, and in which the time-series data can be accurately processed in real time.

2. Description of the Related Art

In a first technique for detecting such periodicity information according to the prior art, some data patterns are presumed in advance and stored in a memory, e.g., a RAM (Random Access Memory), by utilizing a computer system. Further, the computer system carries out a process for matching the stored data patterns with time-series data, which is to be input to the computer system. Finally, by extracting data patterns, conforming to the stored data patterns, from the time-series data, periodicity information about the periodicity in the time-series data which is to be processed can be detected.

In a second technique for detecting the periodicity information according to the prior art, a history of time-series data in the past is stored in a memory. Further, an autocorrelation function is calculated between the historic time-series data in the past and the time-series data which is to be input to the computer system. Finally, on the basis of the thus calculated autocorrelation function, periodicity information about the periodicity in the time-series data which is to be processed can be detected, similar to the case of the first technique.

However, according to the above-mentioned first technique, it is necessary to presume in advance possible data patterns. More specifically, the above-mentioned process for matching the stored data patterns with the incoming time-series data in the first technique is usually executed by using a method of an FFT (Fast Fourier Transformation). In general, it takes relatively long time to carry out an analysis of the time-series data by using the FFT. Therefore, it is very difficult to adequately handle all the periodicity information about the periodicity in time-series data in real time, even with the aid of a workstation operating at high speed.

Furthermore, in regard to time-series data which does not have these data patterns, a problem occurs in that it is impossible to detect periodicity information.

On the other hand, according to the above-mentioned second technique, an analysis of the time-series data by using the autocorrelation function can be executed at higher speed than the analysis of the time-series data by using the FFT. However, according to the second technique, it is necessary to store in advance a large amount of long-term time-series data in the past.

Further, it is also necessary to execute the a troublesome operating process including the calculation of the autocorrelation function for which the amount of computation is required. Therefore, another problem occurs in that it is almost impossible to detect periodicity information in real time, especially in the case where a small-scale computer system, including a personal computer or the like, is used.

SUMMARY OF THE INVENTION

In view of the above-described problems, the main object of the present invention is to provide an apparatus for detecting periodicity in time-series data, in which periodicity information about the periodicity in time-series data can be easily detected without presupposing the data format of the time-series data, and without using a troublesome operating process which includes a calculation of the autocorrelation function.

A further object of the present invention is to provide an apparatus for detecting periodicity in time-series data having an arbitrary data format, in which the time-series data can be processed in real time in accordance with a simplified operating process.

A still further object of the present invention is to provide an apparatus, for detecting periodicity in time-series data, which can be realized at a remarkably low cost by effectively utilizing the limited hardware in a computer system.

To attain these objects, the apparatus for detecting periodicity in time-series data which is to be processed includes a specifying means for designating respective positions corresponding to coordinates in n-dimensional phase space, which are indicated by incoming time-series data existing at the time when the time-series data is input and also by time-series data of the number of n−1 that have been already input, arranged in series with the incoming time-series data; an extraction means for estimating the frequency of emergence in which the positions of coordinates in n-dimensional phase space designated by the specifying means emerge, by taking into consideration a fluctuation of the time-series data, and extracting at least one characteristic point from the coordinates in n-dimensional phase space on the basis of the thus estimated frequency of emergence; a detection means for checking whether or not the characteristic point at the start point conforms to the characteristic point at the end point, in regard to the characteristic point extracted by the extraction means, and checking whether or not the time-series data passes through every characteristic point extracted by the extraction means, and detecting periodicity information about the periodicity which is included in time-series data formed by every characteristic point; and an output means for determining periodicity information about the periodicity in the time-series data, on the basis of the periodicity information detected by the detection means, and outputting the thus determined periodicity information.

Preferably, in the case where previous positions corresponding to coordinates in n-dimensional phase space, which have been already designated, exist in an area in the vicinity of new positions corresponding to coordinates of n-dimensional phase space which are newly designated, the specifying means specifies the positions corresponding to coordinates in n-dimensional phase space, by defining the new positions of coordinates in n-dimensional phase space as the previous positions thereof.

Further, preferably, in the case where previous a characteristic point which has already been extracted by the extraction means exists in an area in the vicinity of new characteristic point which is newly extracted, the extraction means extracts the characteristic point, by defining the new characteristic point as the previous characteristic point.

Further, preferably, in the case where an operation of continuously extracting the characteristic point is interrupted, the detection means defines the characteristic point which is extracted in the first time after the operation of extracting the characteristic point is started again, as a new characteristic point, and then continues to carry out the operation of extracting the characteristic point.

Further, preferably, the extraction means has an allocation means for allocating predetermined embedded values each of which is given as a weighted value to an area in the vicinity of the positions corresponding to coordinates in n-dimensional phase space designated by the specifying means, with the positions corresponding to coordinates in n-dimensional phase space as the central positions; and a determination means for estimating the degree of the embedded values which are allocated by the allocation means, and determining the characteristic point of the positions of coordinates in n-dimensional phase space, on the basis of the thus estimated embedded values.

Further, preferably, the extraction means also has update means for attenuating the embedded values allocated by the allocation means and updating the embedded values, by an operation with a predetermined period. In this case, the above-mentioned determination means estimates the degree of the embedded values updated by the update means, and determines the characteristic point of the positions of coordinates in n-dimensional phase space, on the basis of the degree of the embedded values updated by the above-mentioned update means.

In a preferred embodiment of the present invention, the detection means is mainly constituted by a unit for discriminating a condition for a closed loop, which discriminates whether or not an orbit formed by every characteristic point extracted by the extraction means takes the closed loop, to detect the periodicity information on the basis of the closed loop.

Further, in the preferred embodiment, the extraction means is partially constituted by a time counter unit which counts the frequency of emergence, and an increment unit which carries out an accumulative addition regarding a value obtained by the time counter unit.

Further, in the preferred embodiment of the present invention, the extraction means is partially constituted by a timer unit which defines the predetermined period, and an attenuation unit which attenuates the embedded values in accordance with an instruction from the timer unit.

According to the present invention, by determining whether or not the orbit formed by every characteristic point takes the closed loop closely related to the periodicity in the time-series data, it becomes easily possible to detect periodicity information about the periodicity in time-series data without presupposing the data format of the time-series data, and without using a troublesome operating process including a calculation of the autocorrelation function.

Further, according to the present invention, by eliminating the troublesome operating process such as the calculation of the autocorrelation function, it becomes possible to detect the periodicity in arbitrary time-series data with a relatively small amount of hardware, in accordance with a simplified operating process in which the time-series data can be handled in real time.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Hereinafter, the description of some preferred embodiments according to the present invention will be given with reference to the accompanying drawings of FIGS. 1 through 10.

Figure 1:
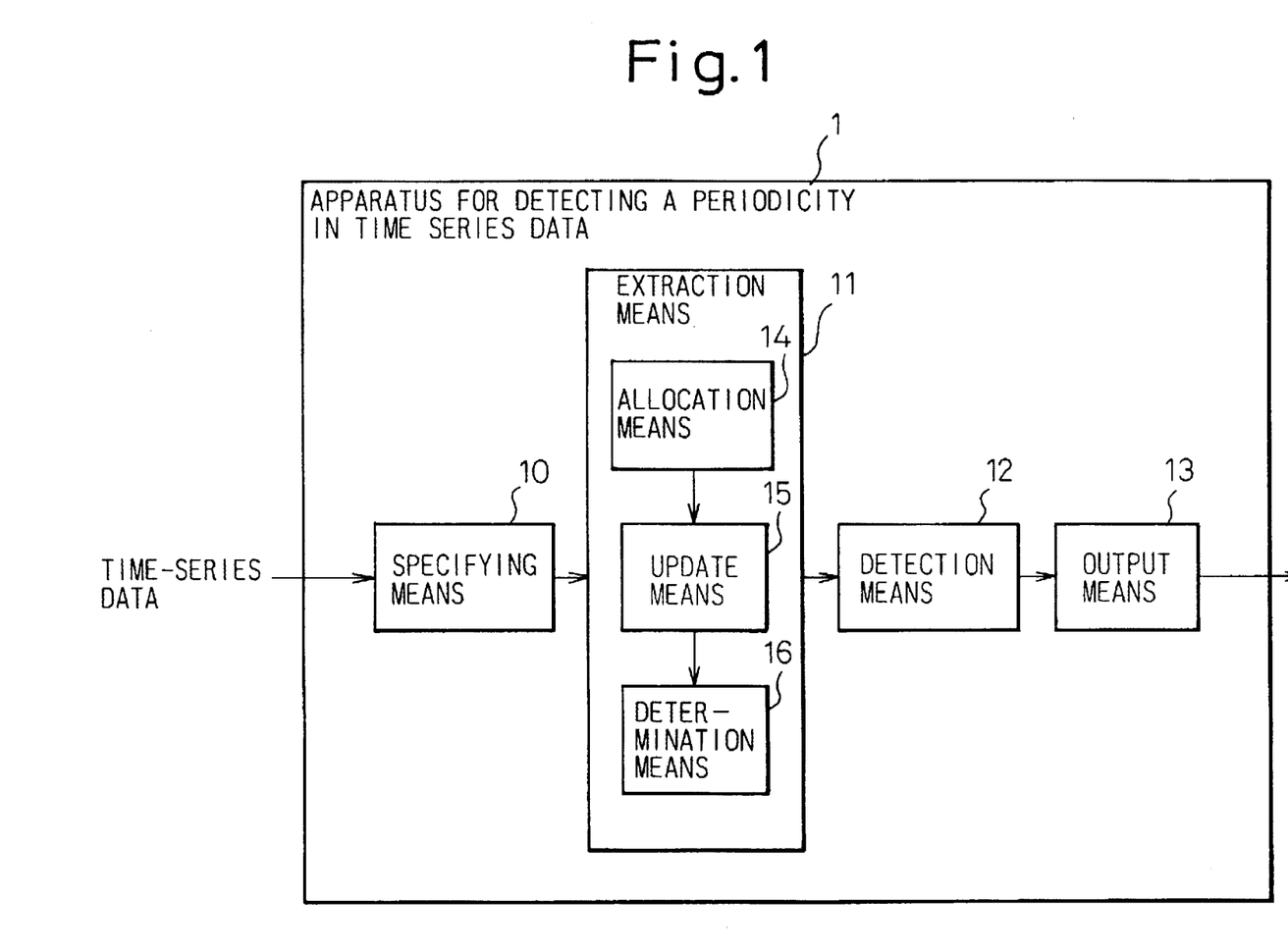
FIG. 1 is a schematic block diagram showing an essential embodiment of the present invention based on the principle of an apparatus for detecting periodicity in time-series data according to the present invention.

FIG. 1 is a schematic block diagram showing an essential embodiment of the present invention based on the principle of an apparatus for detecting periodicity in time-series data according to the present invention.

In this figure, the apparatus 1 for detecting periodicity in time-series data includes a specifying means 10, an extraction means 11, a detection means 12, and an output means 13.

The specifying means 10 designates respective positions corresponding to coordinates in n-dimensional phase space, which are indicated by incoming time-series data existing at the time when the time-series data is input and also by time-series data of the number of n−1 that have been already input, arranged in series with the incoming time-series data.

More specifically, in the case where previous positions corresponding to coordinates in n-dimensional phase space which have already been designated exist in an area in the vicinity of new positions corresponding to coordinates in n-dimensional phase space which are newly designated, the specifying means 10 preferably specifies the positions corresponding to coordinates in n-dimensional phase space, by defining the new positions of coordinates in n-dimensional phase space as the previous positions thereof.

Further, in FIG. 1, the extraction means 11 estimates the frequency of emergence in which the positions corresponding to coordinates in n-dimensional phase space designated by the specifying means emerge, by taking into consideration a fluctuation of the time-series data, and extracting at least one characteristic point from the coordinates in n-dimensional phase space on the basis of the thus estimated frequency of emergence.

More specifically, in the case where a previous characteristic point, which has been already extracted by the extraction means 11, exists in an area in the vicinity of new characteristic point which is newly extracted, the extraction means 11 preferably extracts the characteristic point, by defining the new characteristic point as the previous characteristic point.

Further, in FIG. 1, the extraction means 11 has an allocation means 14 for allocating predetermined embedded values each of which is given as a weighted value to an area in the vicinity of the positions corresponding to coordinates in n-dimensional phase space designated by the specifying means 10, with the positions corresponding to coordinates in n-dimensional phase space as the central positions.

Further, the extraction means 11 also has an update means 15 for attenuating the embedded values allocated by the allocation means and updating the embedded values, by an operation with a predetermined period. In this case, a determination means 16 is preferably provided in the extraction means 11, which estimates the degree of the embedded values updated by the update means 15 and then determines the characteristic point of the positions of coordinates in n-dimensional phase space, on the basis of the degree of the embedded values updated by the above-mentioned update means 15.

Further, in FIG. 1, the detection means 12 checks whether or not the characteristic point at the start point conforms to the characteristic point at the end point, in regard to the characteristic point extracted by the extraction means 11, and also checks whether or not the time-series data passes through every characteristic point extracted by the extraction means 11, and finally detects periodicity information about the periodicity which is included in time-series data formed by every characteristic point.

More specifically, in the case where an operation of continuously extracting the characteristic point is interrupted, the detection means 12 preferably defines the characteristic point which is extracted the first time after the operation of extracting the characteristic point is started again, as a new characteristic point, and then continues to carry out the operation of extracting the characteristic points.

Further, in FIG. 1, the output means 13 determines periodicity information about the periodicity in the time-series data, on the basis of the periodicity information detected by the detection means 12, and then outputs the thus determined periodicity information.

Figure 2:
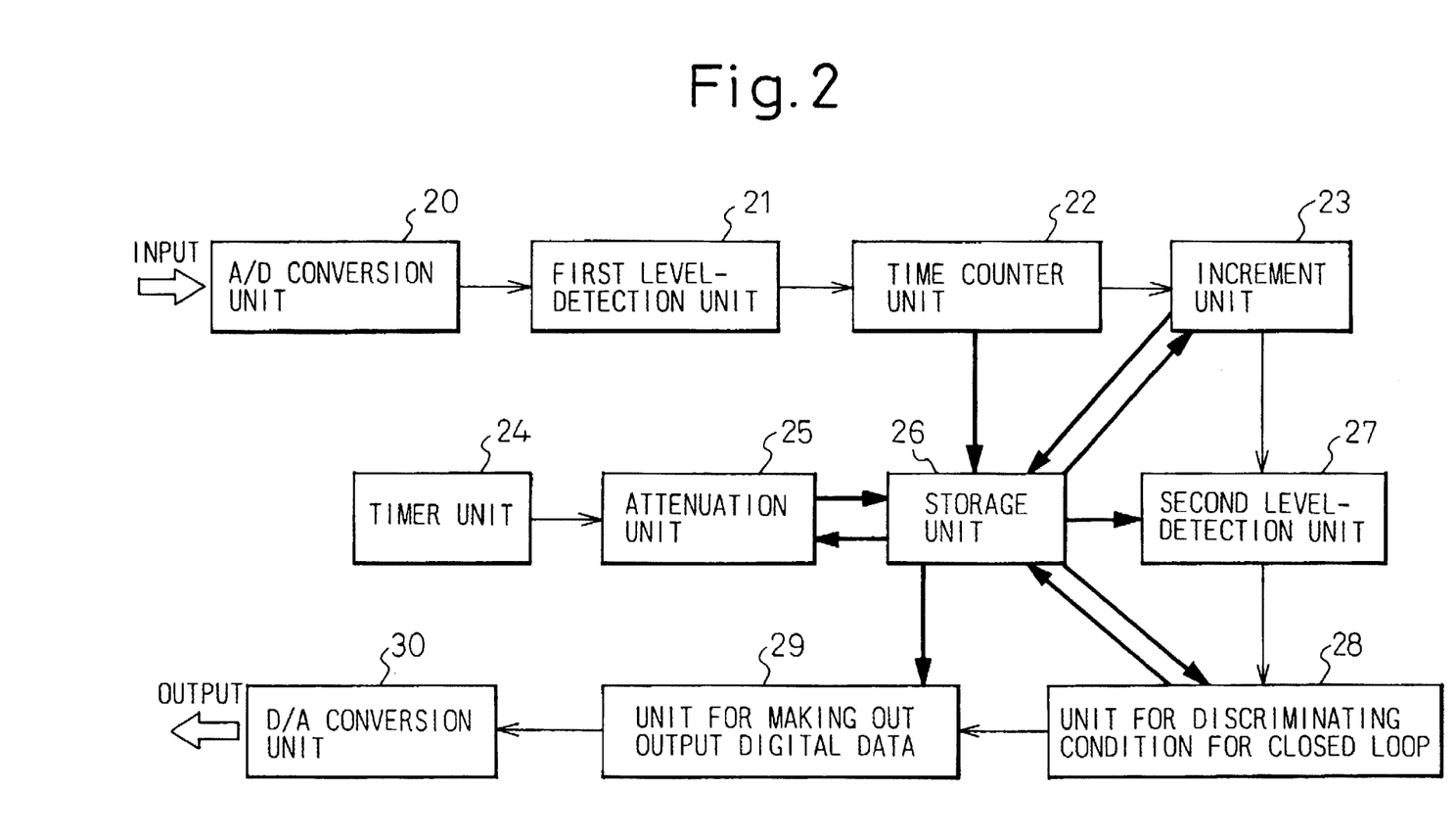
FIG. 2 is a block diagram showing a preferred embodiment according to the present invention.

FIG. 2 is a block diagram showing a preferred embodiment according to the present invention.

In this case, a more concrete example of the apparatus for detecting periodicity in time-series data, in which such an apparatus is realized by some hardware in a computer system, will be representatively illustrated. Hereinafter, any component which is the same as that mentioned before will be referred to using the same reference numeral.

In FIG. 2, 20 denotes an A/D conversion unit which converts analog time-series data which is input to the apparatus to digital time-series data, so that the input time-series data can be processed by a computer system. The A/D conversion unit 20 can be constituted by a conventional A/D converter.

Preferably, the specifying means 10, the extraction means 11 and the detection means 12, as shown in FIG. 1, are realized by a CPU of a computer system.

More specifically, in FIG. 2, the specifying means 10 has a first level-detection unit 21 which detects respective positions corresponding to coordinates in n-dimensional phase space, that are indicated by digital time-series data sent from the A/D conversion unit 20, by comparing each level of the time-series data with a predetermined reference level.

Further, in FIG. 2, the extraction means 11 has a time counter unit 22, an increment unit 23 and a storage unit 26.

The time counter unit 22 operates to count the frequency of emergence in which the specified position related to coordinates in n-dimensional phase space emerges by utilizing a counter provided in a CPU. A counting value in the time counter unit 22 is temporarily stored in the storage unit 26, e.g., a register. The thus stored counting value increases by a value "1", every time the specified position obtained from coordinates in n-dimensional phase space emerges, by utilizing the increment unit 23.

Further, the extraction means 11 also has a timer unit 24 and an attenuation unit 25.

The timer unit 24 operates to define the predetermined period with which each of the predetermined embedded values that is given as a weighted value to an area, in the vicinity of the positions corresponding to coordinates in n-dimensional phase space designated by the specifying means 10.

The attenuation unit 25 operates to attenuate the embedded values in accordance with an instruction (signal) from the timer unit 24, when the time has arrived at the end of the predetermined period. The thus attenuated embedded values are also stored in the storage unit 26. At this time, the embedded values previously stored in the storage unit 26 are updated.

Further, in FIG. 2, the extraction means 11 has a time counter unit 22, an increment unit 23 and a storage unit 26.

Further, the detection means 12 has a second level-detection unit 27 and an unit for discriminating a condition for a closed loop 28.

The second level-detection unit 27 operates to detect one or a plurality of characteristic points of the positions corresponding to coordinates in n-dimensional phase space, which are determined on the basis of the embedded values attenuated and updated by the extraction means 11.

The unit for discriminating a condition for a closed loop 28 operates to detect whether or not an orbit formed by every characteristic point extracted by the extraction means 11 takes a closed loop, i.e., whether or not the time-series data, which is to be processed, has the periodicity.

Further, in FIG. 2, the output means 13 has a unit for making out output digital data 29 and a D/A conversion unit 30.

The unit for making out output digital data 29 can be realized by a CPU which operates to make out digital data including periodicity information about the input time-series data, on the basis of the result obtained from the unit 28 and values stored in the storage unit 26.

The D/A conversion unit 30 is constituted by a conventional D/A converter which again converts digital time-series data to analog time-series data.

According to the embodiment of the present invention shown in FIG. 2, most components in an apparatus for detecting the periodicity in time-series data can be constituted by a CPU and small-scaled hardware at a relatively low production cost.

Figure 3:
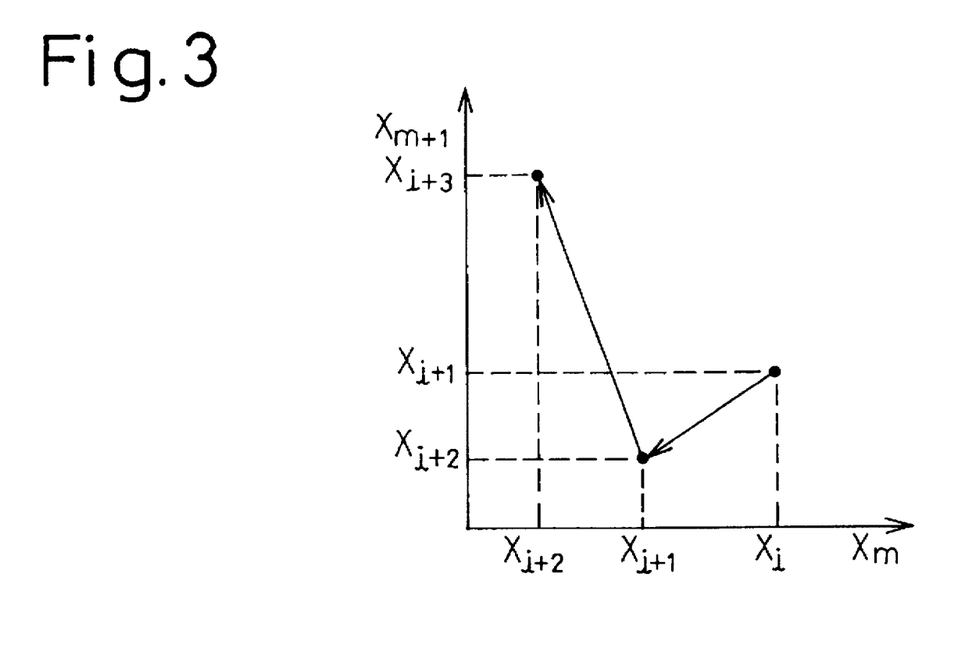
FIG. 3 is a graph for explaining a process for specifying respective positions corresponding to two-dimensional phase space in a specifying means shown in FIG. 1.

FIG. 3 is a graph for explaining a process for specifying respective positions corresponding to two-dimensional phase space in a specifying means shown in FIG. 1.

As already described in FIG. 1, when time-series data, which is constituted by a plurality of discrete time periods $x_m$ and is to be processed, is successively input to the apparatus 1 for detecting periodicity in the time-series data, the specifying means 10 designates respective positions corresponding to coordinates in n-dimensional phase space. In this case, these positions are indicated by incoming time-series data and also time-series data of the number of n−1 that have been already input to the apparatus 1 in succession to the incoming time-series data.

Here, it is assumed that the number n equals 2 (n=2) and time-series data constituted by a plurality of discrete time periods $x_m$ (m=1, . . . , i, i+1 . . . ) is sequentially input in the following order:

"$x_1 \rightarrow x_{i+1} \rightarrow x_{i+2} \rightarrow x_{i+3} \cdots$".

In this case, as shown in FIG. 3, time-series data (including time periods $x_i$ to $x_{i+3}$) can be specified as the respective positions corresponding to coordinates in two-dimensional phase space. An abscissa of the graph of the two-dimensional phase space denotes a value of each time period $x_m$, while an ordinate of the graph denotes each time period $x_{m+1}$, at the timing subsequent to the former time period $x_m$.

In such a two-dimensional phase space shown in FIG. 3, the respective positions corresponding to coordinates in two-dimensional phase space are specified as follows:

"$(x_i, x_{i+1}) \rightarrow (x_{i+1}, x_{i+2}) \rightarrow (x_{i+2}, x_{i+3}) \cdots$".

Figure 4:
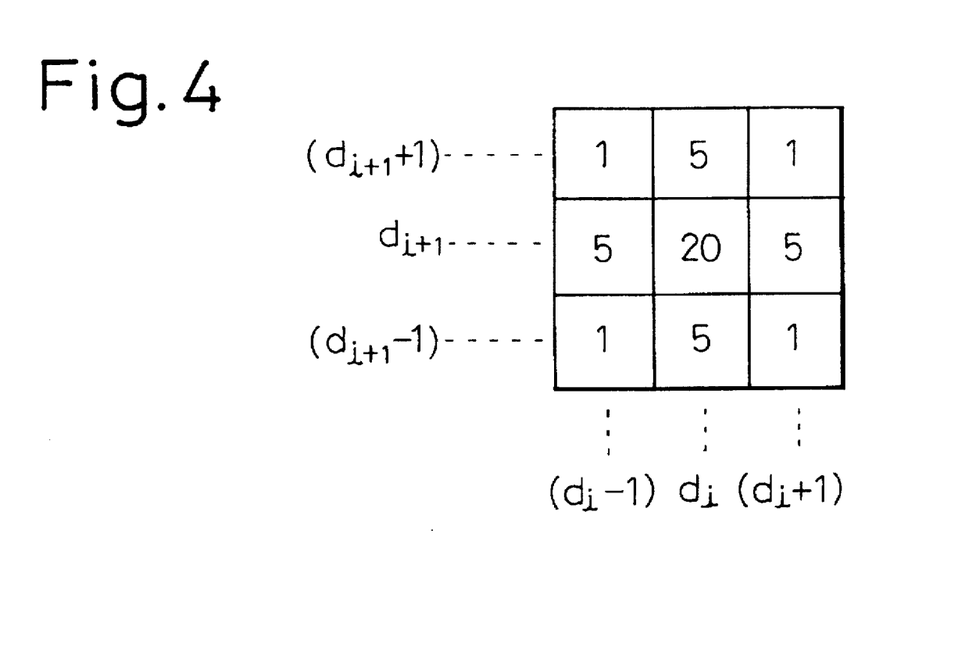
FIG. 4 is a schematic diagram for explaining embedded values allocated by an allocation means shown in FIG. 1.

FIG. 4 is a schematic diagram for explaining embedded values allocated by an allocation means shown in FIG. 1.

On the basis of the above-mentioned process for specifying the respective positions of n-dimensional phase space, the allocation means 14 (FIG. 1) allocates predetermined embedded values each of which is given as a weighted value to an area in the vicinity of the positions corresponding to coordinates in n-dimensional phase space designated by the specifying means 10. In this case, the embedded values are weighted, by defining the positions corresponding to coordinates in n-dimensional phase space as the central positions of an area in the vicinity of these positions.

If it is assumed that the number n equals 2 (n=2) in FIG. 4, similar to the case of FIG. 3, an embedded value having a weighted value "20" is given to the position corresponding to coordinate ($d_i$, $d_{i+1}$) of two-dimensional phase space designated by the specifying means 10.

Further, embedded values each having a weighted value "5" are allocated to two positions corresponding to coordinates ($d_{i-1}$, $d_{i+1}$) and ($d_i+1$, $d_{i+1}$) adjacent to the coordinate ($d_i$, $d_{i+1}$) of two-dimensional phase space designated by the specifying means 10, at the left side and the right of the latter coordinate, respectively.

Also, embedded values each having a weighted value "5" are allocated to two positions corresponding to coordinates ($d_i$, $d_{i+1}+1$) and ($d_i$, $d_{i+1}-1$) adjacent to the coordinate ($d_i$, $d_{i+1}$) of two-dimensional phase space designated by the specifying means 10, in the upper side and the lower side of the latter coordinate, respectively.

Further, embedded values each having a weighted value "1" are allocated to four positions respectively corresponding to coordinates adjacent to the coordinate ($d_i$, $d_{i+1}$) of two-dimensional phase space designated by the specifying means 10, in the directions of two diagonal lines.

On the basis of the above-mentioned process for allocating the embedded values, predetermined embedded values are allocated to an area in the vicinity of the respective positions corresponding to coordinates (e.g., the above-mentioned central coordinate ($d_i$, $d_{i+1}$)) of n-dimensional phase space. More specifically, when time-series data which is to be processed is sequentially input to an apparatus for detecting the periodicity in time-series data, the specifying means operates to allocate these embedded values to an area in the vicinity of each position corresponding to each central coordinate specified by the time-series data.

In such a process for allocating the embedded values, in accordance with the accuracy of periodicity in the time-series data, the embedded values allocated by the allocation means tend to increase. However, it should be noted that, even when some noise is added to signals constituting time-series data during a certain period, unnecessary embedded values may be generated due to noise and gradually increase as the time-series data is processed by the allocation means.

To avoid the increase in embedded values due to noise, the update means 15 (FIG. 1) operates to attenuate the embedded values allocated by the allocation means and to reduce the noise level, when the time has arrived at the end of the predetermined period, so that the embedded values can be updated with such an adequate period. Subsequently, on the basis of a process for updating the embedded values, the determination means 16 (FIG. 1) operates to estimate the degree of the embedded values updated by the update means and to extract positions of coordinates in n-dimensional phase space, each of which has an embedded value that is equal to or more than a predetermined value. Finally, the determination means dynamically defines the thus extracted positions as a plurality of characteristic points of the positions of coordinates in n-dimensional phase space.

In such a technique, which includes the process carried out by the allocation means, the update means and the determination means, the characteristic points of the positions, corresponding to coordinates in n-dimensional phase space, can be extracted without being influenced by the fluctuation of the time-series data that occurs due to some noise.

Every time a characteristic point, which may be defined as the characteristic point at the end point, is extracted by the extraction means 11 (FIG. 1), the detection means 12 (FIG. 1) operates to check whether or not the characteristic point at the start point conforms to the characteristic point at the end point, in regard to a plurality of characteristic points extracted by the extraction means. Further, the detection means also operates to check whether or not time-series data passes through all the characteristic points extracted by the extraction means, and to detect periodicity information about the periodicity which is included in time-series data formed by the thus extracted characteristic points.

Figure 5A:
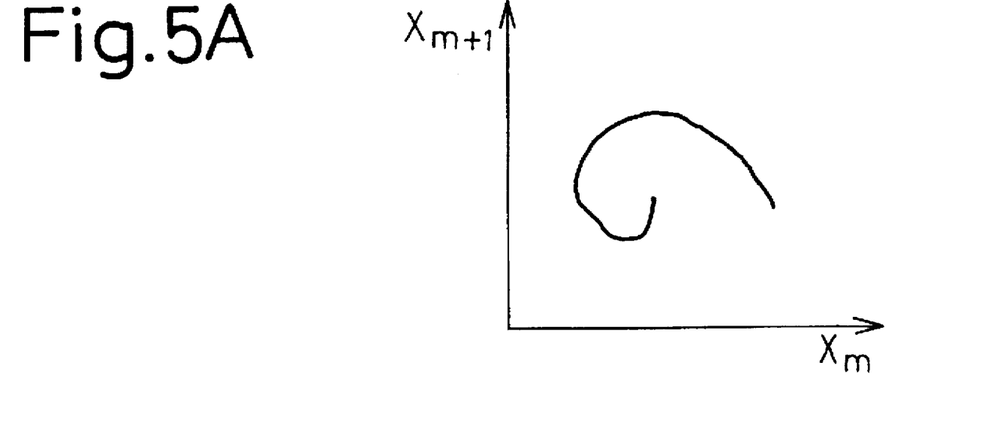
FIG. 5A is a graph showing a first example of an orbit defined by some characteristic points.
Figure 5B:
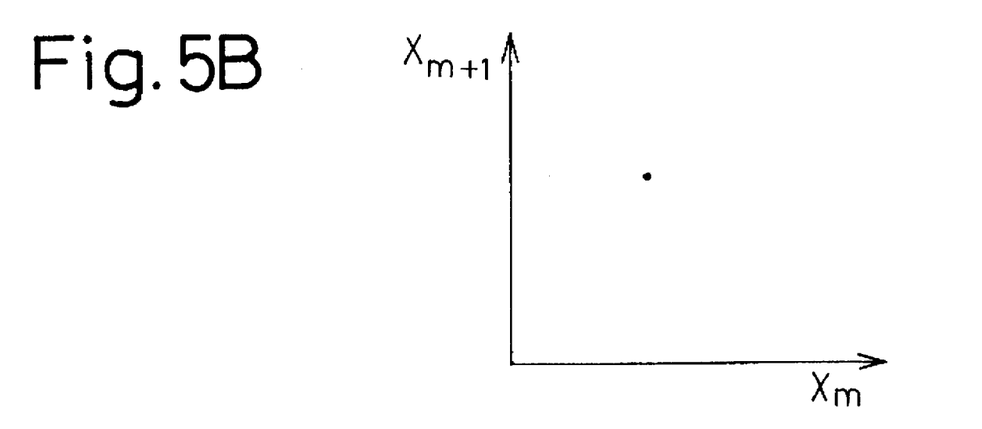
FIG. 5B is a graph showing a second example of an orbit defined by some characteristic points.
Figure 5C:
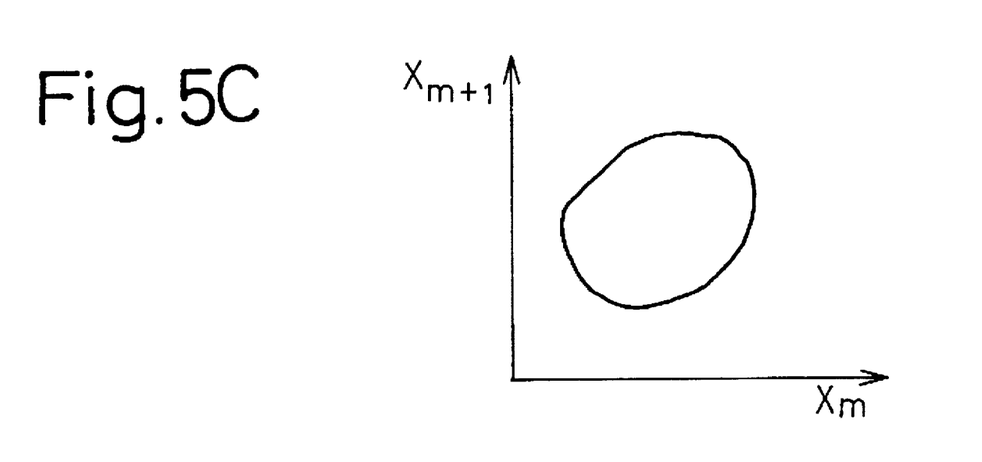
FIG. 5C is a graph showing a third example of an orbit defined by some characteristic points.

FIG. 5A is a graph showing a first example of an orbit defined by some characteristic points; FIG. 5B is a graph showing a second example of an orbit defined by some characteristic points; and FIG. 5C is a graph showing a third example of an orbit defined by some characteristic points. In each of these figures, a technique for detecting the periodicity in time-series data, by simply examining an orbit defined by a plurality of characteristic points, will be illustrated.

In the case where time-series data which is to be processed has no periodicity, the time-series data does not pass through every characteristic point extracted by the extraction means. Alternatively, as shown in FIG. 5A, an orbit defined by the characteristic points makes a random motion in a graph of two-dimensional phase space. In this case, as apparent from FIG. 5A, a characteristic point at the start point of the orbit does not conform to a characteristic point at the end point of the orbit.

On the other hand, in the case where time-series data which is to be processed has a certain periodicity, as shown in FIG. 5B, the time-series data passes through the same characteristic point, i.e., a fixed point.

Further, in the case where time-series data has a certain periodicity, as shown in FIG. 5B, an orbit takes the form of periodicity, in which time-series data passes through a characteristic point at the start point of the orbit, and then passes through each characteristic point once or a plurality of times, and finally returns to the characteristic point at the start point of the same orbit. Namely, when the orbit shown in the graph of n-dimensional phase space, e.g., two-dimensional phase space) takes the closed loop (including the fixed point), it can be concluded that incoming time-series data has the periodicity.

In such a technique, by following an orbit or locus defined by a plurality of characteristic points extracted by the extraction means, it becomes easily possible to detect periodicity information about the periodicity which is included in time-series data formed by the thus extracted characteristic points.

The result of detection of the periodicity in time-series data is sent to the output means 13. The output means 13 (FIG. 1) operates to determine periodicity information about the periodicity in the time-series data, on the basis of the periodicity information corresponding to the result of detection, and to output the thus determined periodicity information.

According to the above-mentioned technique for detecting the periodicity information by utilizing a graph of n-dimensional phase space, a troublesome operating process such as the calculation of the autocorrelation function can be eliminated. Therefore, it becomes possible to rapidly detect the periodicity in arbitrary time-series data, in accordance with a simplified operating process in which the time-series data can be handled in real time.

Figure 6:
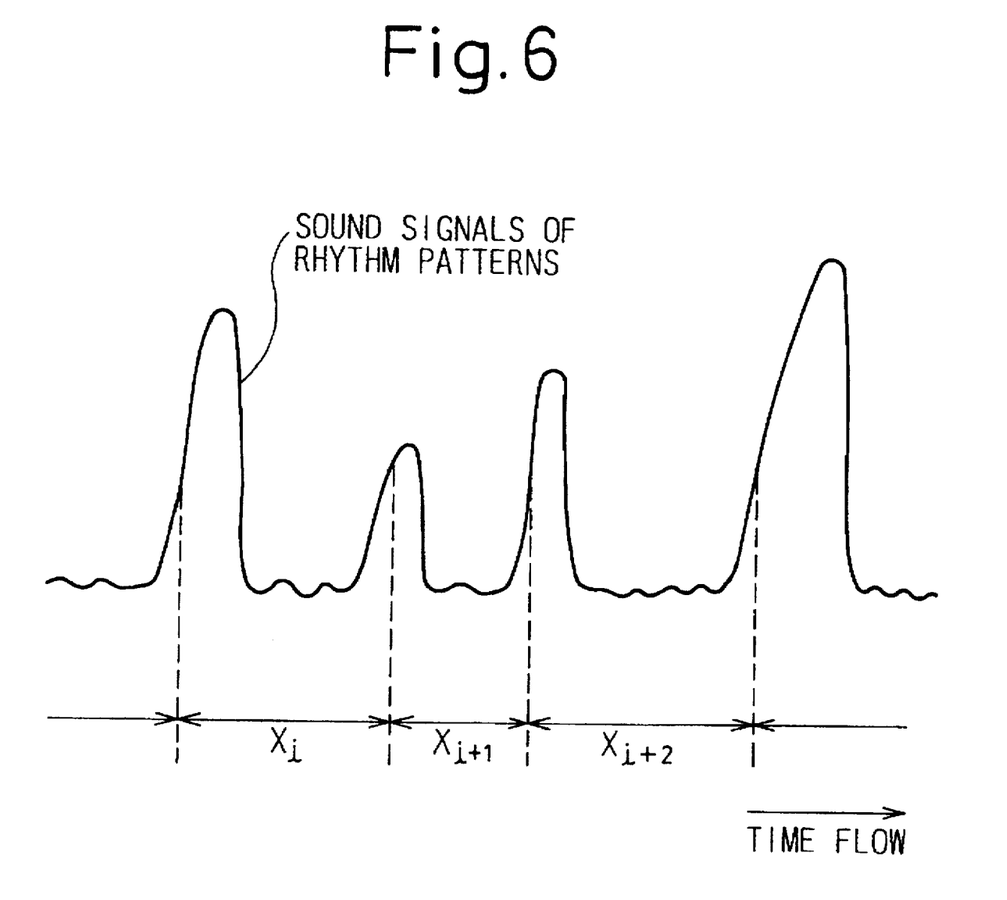
FIG. 6 is a diagram showing an example of time-series data which is to be processed by the present invention.

FIG. 6 is a diagram showing an example of time-series data, which changes periodically with the time flow and is to be processed by the present invention.

The apparatus for detecting the periodicity in time-series data 1 (FIG. 1) has a function for rapidly detecting periodicity information which is included in arbitrary time-series data with a relatively small amount of hardware. For example, in the apparatus 1 of the present invention shown in FIG. 6, the subject for the detection of periodicity information is directed to sound signals of rhythm patterns generated by drums, etc.

In the case where these sound signals of rhythm patterns are selected as the subject for the detection of periodicity information, various time periods $x_m$ ($x_i$, $x_{i+1}$, $x_{i+2}$, ...) between adjoining pronounced (loud) portions, which are included in sound signals of rhythm patterns, are detected by the apparatus 1. Further, time-series data constituted by the time periods $x_m$ is processed by the apparatus 1.

Figure 7A:
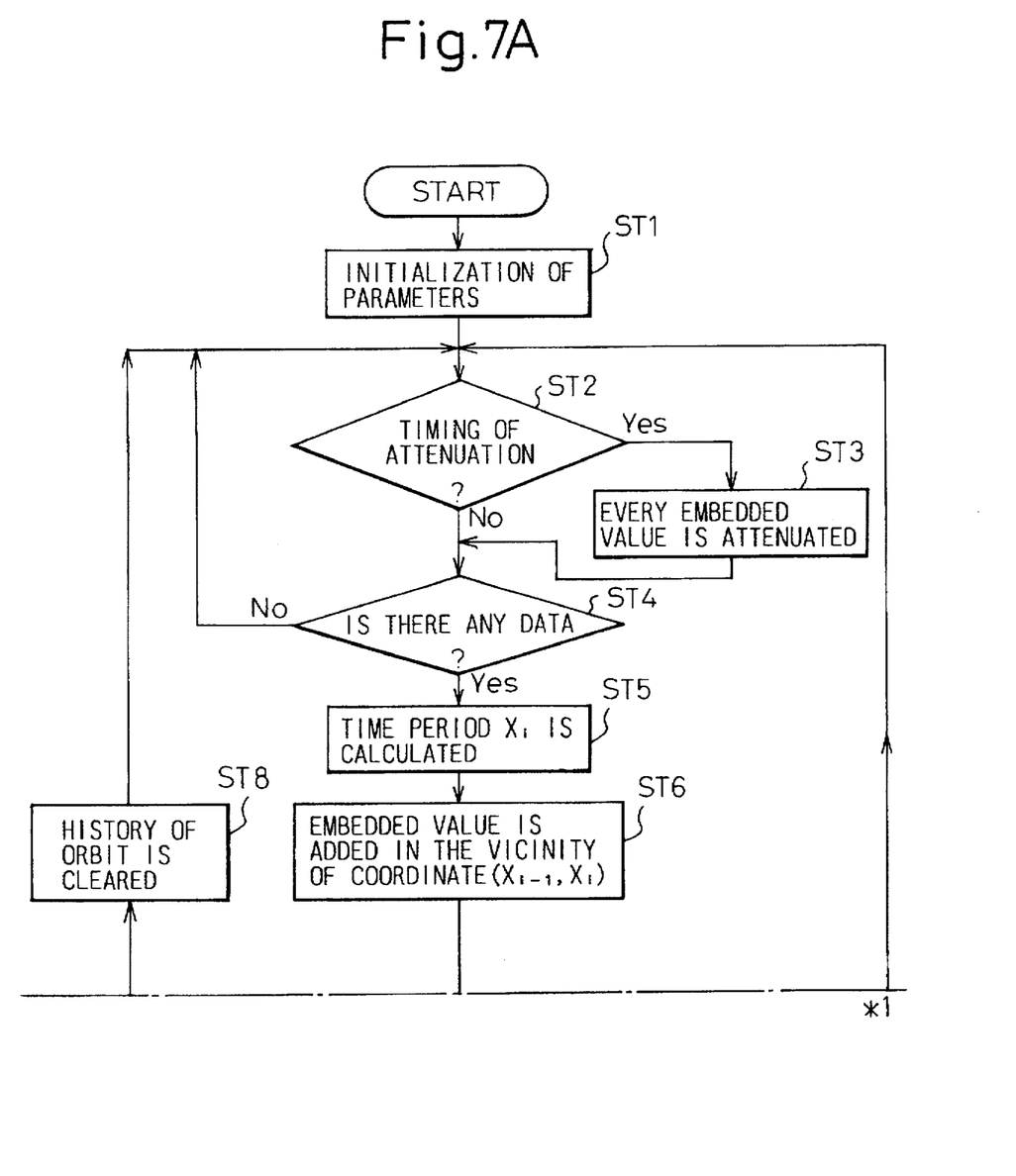
FIG. 7A is a flowchart for explaining the first half of the whole sequence for detecting the periodicity in time-series data which is executed according to the present invention.
Figure 7B:
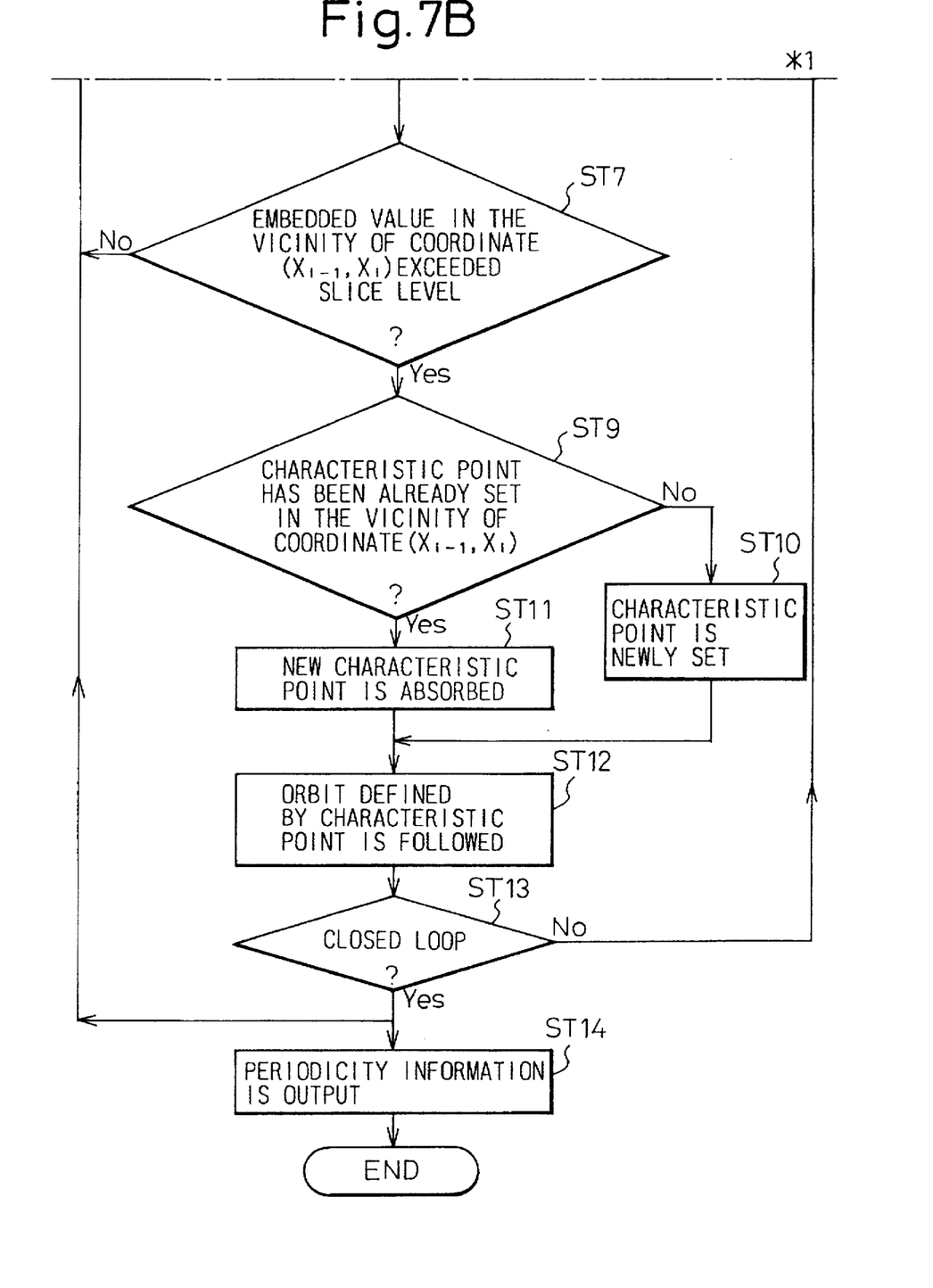
FIG. 7B is a flowchart for explaining the second half of the whole sequence for detecting the periodicity in time-series data which is executed according to the present invention.

FIGS. 7A and 7B are flowcharts for respectively explaining the first and second half of the whole sequence for detecting the periodicity in time-series data which is executed according to the present invention. In FIGS. 7A and 7B, a preferred embodiment related to the typical sequence for detecting the periodicity in time-series data, which is carried out by the apparatus 1, will be illustrated. Hereinafter, a detailed description of a sequential process for detecting the periodicity in time-series data will be given with reference to FIGS. 7A and 7B.

When the request for detecting any periodicity information, which sound signals of rhythm patterns may have, is made by a CPU, etc., first of all, in step ST1 of FIG. 7A, an initialization process of the related parameters is executed.

Next, in step ST2, it is checked whether or not the control has arrived at a time period corresponding to the timing in which embedded values, that are added accumulatively in accordance with below-mentioned step ST6, have to be attenuated. If it is determined that the time flow has arrived at such a time period, all the embedded values are attenuated by subtracting a predetermined amount from each embedded value (sometimes by executing a division for each embedded value) (step ST3).

In the step ST3, even though unnecessary embedded values are generated when time-series data including some noise is input to the apparatus, this type of time-series data does not substantially pass through the same coordinate in two-dimensional phase space at least twice. Therefore, by carrying out the process in the step ST3, embedded values related to some noises can be assuredly eliminated when the time has elapsed over several time periods.

On the other hand, if it is determined that the control has not yet arrived at such a time period in the step ST2, it is checked whether or not pronounced portions in sound signals of rhythm patterns have been input to the apparatus 1 (step ST4). If it is determined that the pronounced portions have not yet been input to the apparatus 1, the sequence returns to the step ST2.

If it is determined that the pronounced portions in sound signals of rhythm patterns have been input to the apparatus 1, time period $x_i$, between the current pronounced portion and the pronounced portion which is included in the rhythm patterns previously input to apparatus 1, is calculated (step ST5).

Subsequently, in step ST6, in accordance with the time period $x_i$ and the preceding time period $x_{i-1}$ obtained in the step ST6, each position ($x_{i-1}$, $x_i$) corresponding to coordinates in two-dimensional phase space is specified. Further, in the step ST6, predetermined embedded values are allocated, each of which is given as a weighted value to an area in the vicinity of the position ($x_{i-1}$, $x_i$) corresponding to coordinates in n-dimensional phase space, with the position $(x_{i-1}, x_i)$ corresponding to coordinates in n-dimensional phase space as the central positions.

A process for allocating the embedded values is carried out by adding accumulatively the previously embedded values to the current embedded values, e.g., embedded values which are typically shown in FIG. 4 (sometimes by executing a multiplication of the previously embedded values by the current embedded values). Here, it is assumed that the process for allocating the embedded values is carried out in the case where the time-series data has the periodicity. In this case, the embedded values are adding accumulatively only in an area in the vicinity of the position corresponding to coordinates in two-dimensional phase space, which depends on the periodicity.

Subsequently, in step ST7 of FIG. 7B, it is checked whether or not the embedded values allocated to an area in the vicinity of the position $(x_{i-}, x_i)$ corresponding to a coordinate in two-dimensional phase space, which was specified in the step ST6 (FIG. 7A), have exceeded a predetermined slice level.

If it is determined that the embedded values allocated to the area have not yet exceeded the predetermined slice level, the sequence proceeds to step ST8 (FIG. 7A). In the step ST8, information about the history of an orbit defined by characteristic points, which is stored in the below-mentioned step ST12 of FIG. 7B, is cleared. Further, the process returns to the step ST2 (FIG. 7A).

In other words, when an operation for continuously detecting a plurality of characteristic points, that will be described hereinafter, is interrupted, an information about the history of an orbit defined by these characteristic points is cleared. Subsequently, the sequence is executed again from the step ST2.

On the other hand, if it is determined that the embedded values allocated to the area have exceeded the predetermined slice level in step ST7 of FIG. 7B, the sequence proceeds to step ST9 of FIG. 7B. In the step ST9, the position $(x_{i-1}, x_i)$ corresponding to a coordinate in two-dimensional phase space, which was specified in the step ST6 (FIG. 7A), is defined as the characteristic point. Further, in the step ST9 of FIG. 7B, it is checked whether or not there are any characteristic points each of which has already been set in an area in the vicinity of the position $(x_{i-1}, x_i)$ corresponding to a coordinate in two-dimensional phase space.

In other words, by accumulatively plotting an area to which the embedded values are allocated, the position $(x_{i-1}, x_i)$ corresponding to a coordinate in two-dimensional phase space, which has relatively large embedded values, is defined as each characteristic point. In such a process for plotting the area, it becomes easily possible to avoid the influence of a fluctuation in the time-series data that occurs due to noise.

As mentioned above, in the ST9, the position $(x_{i-1}, x_i)$ corresponding to a coordinate in two-dimensional phase space is defined as each characteristic point. Alternatively, it may be possible to define a given position, which exists in an area in the vicinity of the position $(x_{i-1}, x_i)$ corresponding to a coordinate in two-dimensional phase space and which has an embedded value that exceeds the predetermined slice level, as each characteristic point.

In this case, it should be noted that the thus defined characteristic point can be dynamically changed. Therefore, even though a certain position has been once defined as a characteristic point, it is possible to stop defining the position as the characteristic point, when an embedded value is attenuated in accordance with the process for attenuating the embedded value as in the step ST3 (FIG. 7B).

If it is determined that there is no characteristic point which has already been set in an area in the vicinity of the position $(x_{i-1}, x_i)$ in the step ST9, the sequence proceeds to step ST10. In the step ST10, the characteristic point, which is set in the step ST9, is processed as a newly defined characteristic point.

On the other hand, if it is determined that there is at least one characteristic point which has already been set in an area in the vicinity of the position $(x_{i-1}, x_i)$ in the step ST9, the sequence proceeds to step ST11. In the step ST11, the new characteristic point, which is set in the step ST9, is treated as the previous characteristic point which has already been set in an area in the vicinity of the position $(x_{i-1}, x_i)$, and is adapted to be absorbed in the previous characteristic point.

The above-mentioned process for treating the new characteristic point as the previous characteristic point will be described in detail with reference to FIG. 8.

Figure 8:
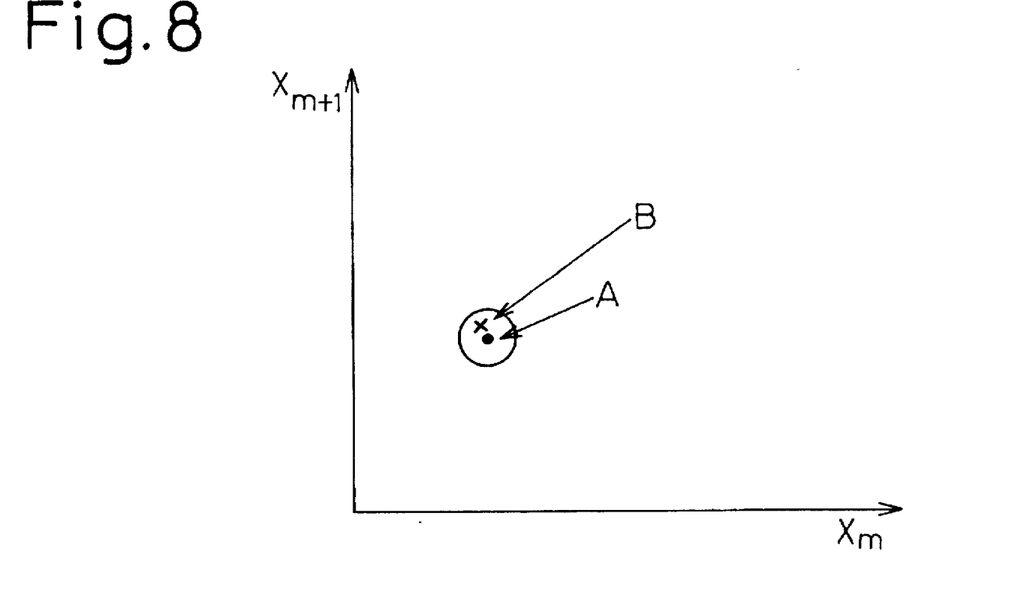
FIG. 8 is a diagram for explaining a process for newly setting a given characteristic point according to the present invention.

In FIG. 8, it is assumed that the new characteristic point "B" is set in an area in the vicinity of the previous characteristic point "A" which has already been set. More specifically, the new characteristic point "B" is treated as the same characteristic point as the previous characteristic point "A" which has already been defined on the basis of the position $(x_{i-1}, x_i)$ corresponding to a coordinate in two-dimensional phase space, by taking into consideration some noise incorporated in the time-series data.

Returning to FIG. 7B, when the process for setting each characteristic point in the step ST10 or in the ST11 is finished, the sequence proceeds to step ST12. In the step ST12, the new characteristic point, which has been set in the step ST10 or in the ST11, is defined as a characteristic point at the end point of an orbit that is formed by every characteristic point. Further, the orbit is followed in the order in which the time-series data passes through each characteristic point. As the result of the process for following the orbit in such a manner, it becomes possible to easily and rapidly detect a periodicity information about a periodicity which is included in the time-series data. Further, in the step ST12, information about a history of the orbit defined by characteristic points is stored in a memory unit.

In other words, in the case where time-series data constituted by a plurality of time periods $x_m$ $(x_i)$ has a certain periodicity, the orbit takes the form of periodicity, which means that the time-series data passes through a characteristic point at the start point of the orbit, and then passes through each characteristic point once or a plurality of times, and finally returns to the characteristic point at the start point of the same orbit. Therefore, when the orbit in the graph of two-dimensional phase space takes the closed loop, it can be concluded that the time-series data has the periodicity.

In such a process, by following an orbit defined by a plurality of characteristic points, it becomes easily possible to detect periodicity information about the periodicity which is included in time-series data formed by the characteristic points.

Figure 9:
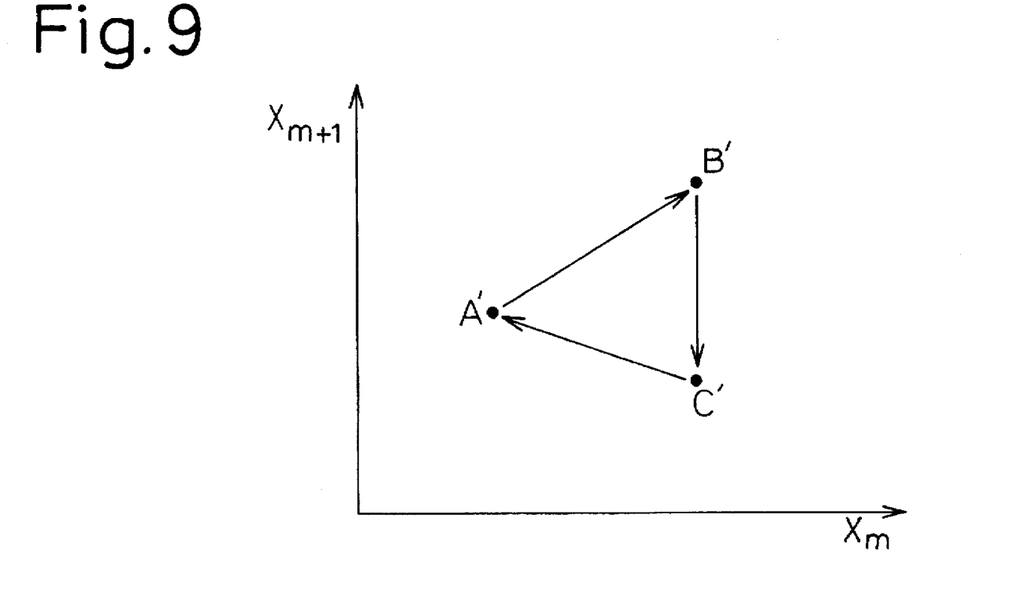
FIG. 9 is a diagram for explaining a process for following an orbit defined by some characteristic points according to the present invention.

The above-mentioned process for following the orbit defined by a plurality of characteristic points in two-dimensional phase space will be representatively illustrated in FIG. 9.

As shown in FIG. 9, in the case where time-series data passes through a characteristic point "A'", a characteristic point "B'" and a characteristic point "C'" and then returns to a characteristic point "A'" at the start point, it is determined that the time-series data has a periodicity.

Returning to FIG. 7B, in step ST13, it is checked whether or not the orbit takes a closed loop, i.e., the form of periodicity. Namely, it is checked whether or not time-series data passes through a characteristic point at the start point of the orbit, and then passes through each characteristic point once or a plurality of times, and finally returns to the characteristic point at the start point of the same orbit.

If it is determined that the orbit takes a closed loop in the step ST13, the sequence proceeds to step ST8 (FIG. 7A). Further, information about the history of an orbit stored in a memory unit in the step ST12 is cleared, and the sequence returns to the step ST2 (FIG. 7A).

Also, when it is determined that the orbit takes the form of periodicity in the step ST13, the sequence proceeds to step ST14. In the step ST14, periodicity information about the periodicity of time-series data is determined, on the basis of the periodicity information corresponding to the closed loop, and the thus determined periodicity information is output.

On the other hand, if it is determined that the orbit does not take a closed loop in the step ST13, the sequence immediately returns to the step ST2 (FIG. 7A).

Figure 10:
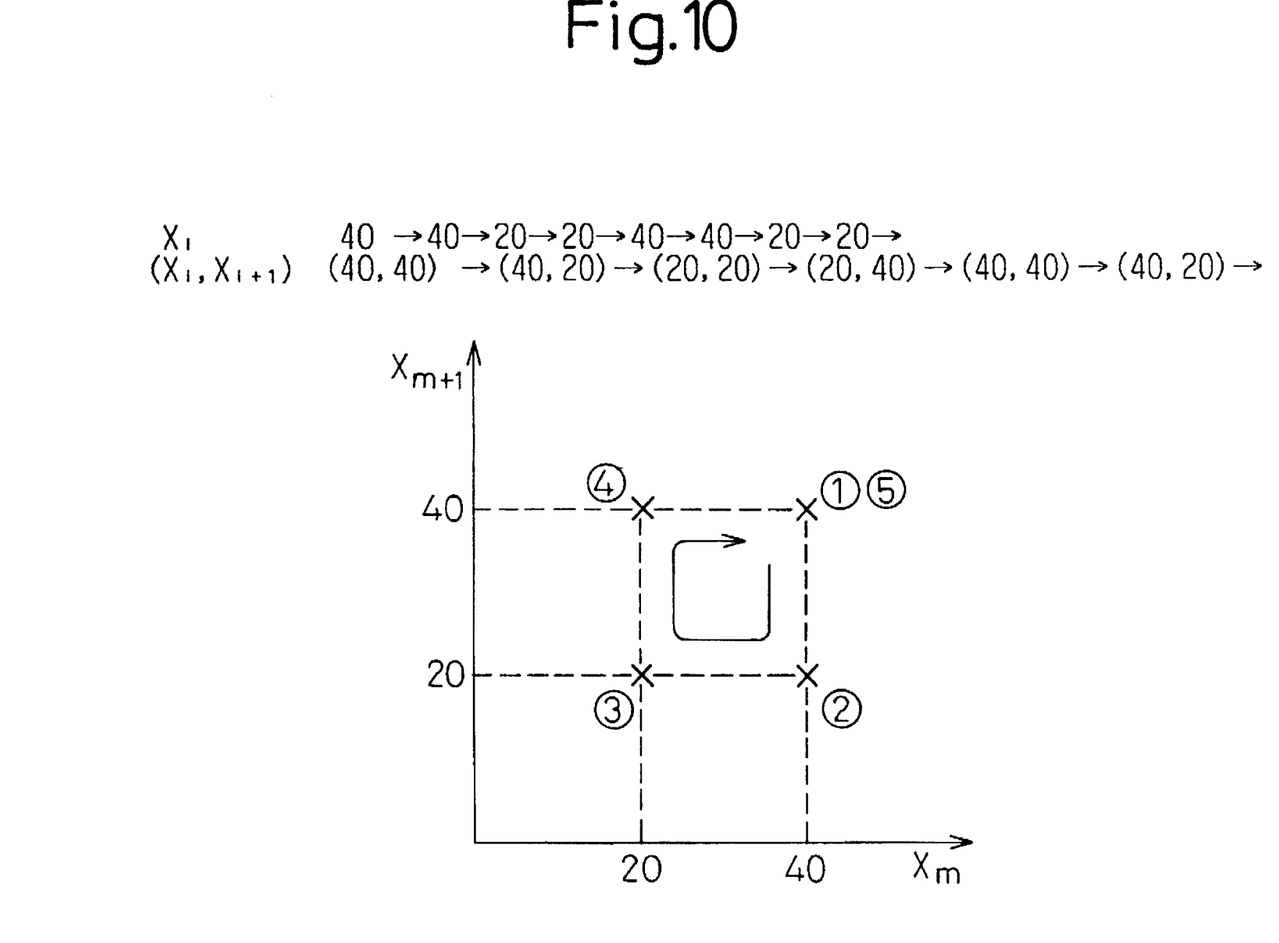
FIG. 10 is a diagram for explaining a process for outputting a periodic information of time-series data which is to be processed according to the present invention.

FIG. 10 is a diagram for explaining a process for outputting periodic information of time-series data which is to be processed according to the present invention.

In FIG. 10, it is assumed that time periods $x_i$, constituting time-series data in sound signals of rhythm patterns, are generated in a following sequence:

"$40 \rightarrow 40 \rightarrow 20 \rightarrow 20 \rightarrow 40 \rightarrow 40 \rightarrow 20 \rightarrow 20 \ldots$".

In this case, by carrying out the process according to the present invention as in FIGS. 7A and 7B, positions $(x_i, x_{i+1})$ corresponding to coordinates in two-dimensional phase space are designated as follows:

"$(40, 40) \rightarrow (40, 20) \rightarrow (20, 20) \rightarrow (20, 40) \rightarrow (40, 40) \rightarrow (40, 20)$".

Further, in FIG. 10, these positions, corresponding to coordinates in two-dimensional phase space, are successively plotted on a graph of two-dimensional phase space a plurality of times. By carrying out such a process for plotting the positions $(x_i, x_{i+1})$, some characteristic points are set. On the basis of an orbit defined by the characteristic points, a closed loop having a rectangular form shown in FIG. 10 is detected as follows:

"$(40, 40) \rightarrow (40, 20) \rightarrow (20, 20) \rightarrow (20, 40) \rightarrow (40, 40)$ or
①→ ②→ ③→ ④→ ⑤(i.e., ①)".

When such a closed loop is detected, periodicity information, which is included in time-series data in sound signals of the following rhythm patterns, is determined and output:

"$40 \rightarrow 40 \rightarrow 20 \rightarrow 20$".

As described above, in the flowcharts shown in FIGS. 7A and 7B, when it is determined that there is at least one characteristic point which has already been set in an area in the vicinity of the position $(x_{i-1}, x_i)$ this characteristic point is treated as the previous characteristic point which has already been set in an area in the vicinity of the position $(x_{i-1}, x_i)$. By using such a technique, it is possible to avoid the influence of a fluctuation in time-series data that occurs due to noise.

In an alternative technique, when a position $(x_{i-1}, x_i)$ corresponding to a coordinate in two-dimensional phase space is newly designated, and further it is confirmed that there is at least one previous position which has already been designated in an area in the vicinity of the newly designated position, the newly designated position may be treated as the previous position.

Further, in the flowcharts shown in FIGS. 7A and 7B, time-series data is adapted to be plotted in two-dimensional phase space. However, in this case, it may be possible to plot the time-series data in n-dimensional phase space where n is equal to or more than three ($n \geq 3$).

In the case where the time-series data is plotted in the higher dimensional (multi-dimensional) phase space, it becomes possible to detect periodicity in the time-series data with higher accuracy.

More specifically, a plurality of characteristic points, which may pass through the same position of coordinate in the case of two-dimensional phase space, can be distributed in the different positions in the case of the higher dimensional phase space. Therefore, an orbit defined by a plurality of characteristic points takes more accurate form, i.e., a more accurate closed loop.

According to the preferred embodiment of the present invention, it becomes possible to detect periodicity information about the periodicity of time-series data with relatively small amount of hardware, in accordance with a simplified operating process in which the time-series data can be handled in real time. Therefore, even when a small-scale computer having a relatively small memory capacity, e.g., a personal computer, is used for detecting periodicity information, it becomes easily possible to detect the periodicity information in accordance with an operating process in real time. Thus, an apparatus for detecting periodicity in time-series data according to the present invention can be applied to various fields.

As one example utilizing such an apparatus, it becomes possible to create a doll, which responds only to a special rhythm that is generated when a man beats time with his hands, and mimics the special rhythm.

In this case, the doll can mimic the man motion without the influence of a fluctuation included in the rhythm. Therefore, the doll can realize a successive motion equivalent to the rhythmical sense recognized by a man. Consequently, it becomes possible to provide a doll, which looks like a living being and for which a man can feel a natural friendship.

As another example utilizing such an apparatus, it becomes possible to create a metronome for controlling a tempo, which detects the rhythm patterns that are originally made by a musical teacher by beating time with the hands, and which successively reproduces the same rhythm patterns hereinafter.

In this type of metronome, unlike a conventional metronome, a natural fluctuation generated by a man can be included. Therefore, a specific expression can be easily created regarding a musical performance, and synchronism with an arbitrary music can be easily realized. Further, in regard to the rhythm patterns, a metronome utilizing an apparatus of the present invention can handle not only the simple musical time patterns, but also more complex patterns. Consequently, such a metronome can be expected to promote more emotional musical performances.

As still another example utilizing such an apparatus, it becomes possible to extract patterns about the strength and the speed of each stroke on a keyboard, etc., using a computer system. On the basis of the thus extracted patterns, it becomes possible to realize a new data-input system in which adequate commands corresponding to the extracted patterns are issued.

We claim:

1. An apparatus for detecting periodicity indicating a level change in time-series data which are to be processed and whose levels change periodically with the lapse of time, comprising:

specifying means for designating respective positions corresponding to coordinates in n-dimensional phase space, which are indicated by incoming time-series data existing at the time when the time-series data which is to be processed is input to said apparatus and also by time-series data of the number of n−1 that are arranged in series with the incoming time-series data and that have been already input to said apparatus;

extraction means for estimating the frequency of emergence in which said positions of coordinates in n-dimensional phase space designated by said specifying means emerge, by taking into consideration a fluctuation of the time-series data, and extracting at least one characteristic point from said coordinates in n-dimensional phase space on the basis of the thus estimated frequency of emergence;

detection means for checking whether or not said characteristic point at a start point conforms to said characteristic point at an end point, in regard to said characteristic point extracted by said extraction means, and checking whether or not said time-series data passes through every characteristic point extracted by said extraction means, and detecting a periodicity information about a periodicity which is included in time-series data formed by said every characteristic point extracted by said extraction means; and output means for determining periodicity information about the periodicity in the time-series data which is to be processed, on the basis of the periodicity information detected by said detection means, and outputting the thus determined periodicity information.

2. An apparatus as set forth in claim 1, wherein, when a previous characteristic point which has been already extracted by said extraction means exists in an area in the vicinity of new characteristic point which is newly extracted, said extraction means is operative to extract the characteristic point, by defining said new characteristic point as said previous characteristic point.

3. An apparatus as set forth in claim 2, wherein, when an operation of continuously extracting the characteristic point is interrupted, said detection means is operative to define the characteristic point which is extracted in the first time after the operation of extracting the characteristic point is started again, as a new characteristic point, and then to continue to carry out the operation of extracting the characteristic point.

4. An apparatus as set forth in claim 2, wherein said extraction means comprises:

allocation means for allocating predetermined embedded values, each of which is given as a weighted value, to an area in the vicinity of the positions corresponding to coordinates in n-dimensional phase space designated by said specifying means, with the positions corresponding to coordinates in n-dimensional phase space as the central positions; and determination means for estimating the degree of said embedded values which are allocated by said allocation means, and determining the characteristic point of the positions of coordinates in n-dimensional phase space, on the basis of the thus estimated embedded values.

5. An apparatus as set forth in claim 4, wherein said extraction means further comprises update means for attenuating the embedded values allocated by said allocation means and updating said embedded values, by an operation with a predetermined period, and wherein said determination means is operative to estimate the degree of said embedded values updated by said update means, and to determine the characteristic point of the positions of coordinates in n-dimensional phase space, on the basis of the degree of said embedded values updated by said update means.

6. An apparatus as set forth in claim 1, wherein, when an operation of continuously extracting the characteristic point is interrupted, said detection means is operative to define the characteristic point which is extracted in the first time after the operation of extracting the characteristic point is started again, as a new characteristic point, and then to continue to carry out the operation of extracting the characteristic point.

7. An apparatus as set forth in claim 6, wherein said detection means has a unit for discriminating a condition for a closed loop, which determines whether an orbit formed by every characteristic point extracted by said extraction means takes said closed loop, to detect said periodicity information on the basis of said closed loop.

8. An apparatus as set forth in claim 6, wherein said extraction means comprises:

allocation means for allocating predetermined embedded values, each of which is given as a weighted value, to an area in the vicinity of the positions corresponding to coordinates in n-dimensional phase space designated by said specifying means, with the positions corresponding to coordinates in n-dimensional phase space as the central positions; and determination means for estimating the degree of said embedded values, which are allocated by said allocation means, and determining the characteristic point of the positions of coordinates in n-dimensional phase space, on the basis of the thus estimated embedded values.

9. An apparatus as set forth in claim 8, wherein said extraction means further comprises update means for attenuating the embedded values allocated by said allocation means and updating said embedded values, by an operation with a predetermined period, and wherein said determination means is operative to estimate the degree of said embedded values updated by said update means, and to determine the characteristic point of the positions of coordinates in n-dimensional phase space, on the basis of the degree of said embedded values updated by said update means.

10. An apparatus as set forth in claim 1, wherein, in the case where previous positions corresponding to coordinates in n-dimensional phase space which have been already designated exist in an area in the vicinity of new positions corresponding to coordinates in n-dimensional phase space which are newly designated, said specifying means is operative to specify the positions corresponding to coordinates in n-dimensional phase space, by defining said new positions of coordinates in the n-dimensional phase space as said previous positions of coordinates in n-dimensional phase space.

11. An apparatus as set forth in claim 10, wherein when previous characteristic point which has already been extracted by said extraction means exists in an area in the vicinity of new characteristic point which is newly extracted, said extraction means is operative to extract the characteristic point, by defining said new characteristic point as said previous characteristic point.

12. An apparatus as set forth in claim 10, wherein when an operation of continuously extracting the characteristic point is interrupted, said detection means is operative to define the characteristic point which is extracted the first time after the operation of extracting the characteristic point is started again, as the new characteristic point, and then to continue to carry out the operation of extracting the characteristic point.

13. An apparatus as set forth in claim 10, wherein said extraction means comprises:

allocation means for allocating predetermined embedded values each of which is given as a weighted value to an area in the vicinity of the positions corresponding to coordinates in n-dimensional phase space designated by said specifying means, with the positions corresponding to coordinates in n-dimensional phase space as the central positions; and determination means for estimating the degree of said embedded values which are allocated by said allocation means, and determining the characteristic point of the positions of the coordinates in n-dimensional phase space, on the basis of the thus estimated embedded values.

14. An apparatus as set forth in claim 13, wherein said extraction means further comprises update means for attenuating the embedded values allocated by said allocation means and updating said embedded values, by an operation with a predetermined period, and wherein said determination means is operative to estimate the degree of said embedded values updated by said update means, and to determine the characteristic point of the positions of coordinates in n-dimensional phase space, on the basis of the degree of said embedded values updated by said update means.

15. An apparatus as set forth in claim 1, wherein said extraction means comprises:

allocation means for allocating predetermined embedded values each of which is given as a weighted value to an area in the vicinity of the positions corresponding to coordinates in n-dimensional phase space designated by said specifying means, with the positions corresponding to coordinates in n-dimensional phase space as the central positions; and determination means for estimating the degree of said embedded values which are allocated by said allocation means, and determining the characteristic point of the positions of coordinates in n-dimensional phase space, on the basis of the thus estimated embedded values.

16. An apparatus as set forth in claim 15, wherein said extraction means further comprises:

a time counter unit which counts the frequency of emergence in which said positions of coordinates in n-dimensional phase space emerge; and an increment unit which carries out an accumulative addition regarding a value obtained by said time counter unit.

17. An apparatus as set forth in claim 15, wherein said extraction means further includes update means for attenuating the embedded values allocated by said allocation means and updating said embedded values, by an operation with a predetermined period, and wherein said determination means is operative to estimate the degree of said embedded values updated by said update means, and to determine the characteristic point of the positions of coordinates in n-dimensional phase space, on the basis of the degree of said embedded values updated by said update means.

18. An apparatus as set forth in claim 17, wherein said extraction means further comprises:

a time counter unit which counts the frequency of emergence in which said positions of coordinates in n-dimensional phase space emerge; and an increment unit which carries out an accumulative addition regarding a value obtained by said time counter unit.

19. An apparatus as set forth in claim 17, wherein said extraction means further comprises a timer unit which defines said predetermined period and an attenuation unit which attenuates said embedded values in accordance with an instruction from said timer unit.

20. A method for detecting periodicity indicating a level change and whose levels change periodically with the lapse of time in time-series data which are to be processed, comprising:

designating respective positions corresponding to coordinates in n-dimensional phase space, which are indicated by incoming time-series data existing at the time when the time-series data which is to be processed is input to said apparatus and also by time-series data of the number of n−1 that are arranged in series with the incoming time-series data and that have been already input to said apparatus;

estimating the frequency of emergence in which said positions of coordinates in n-dimensional phase space emerge, by taking into consideration a fluctuation of the time-series data, and extracting at least one characteristic point from said coordinates in n-dimensional phase space on the basis of the thus estimated frequency of emergence;

checking whether said characteristic point at the start point conforms to said characteristic point at the end point, in regard to said extracted characteristic point, and checking whether said time-series data passes through every extracted characteristic point, and detecting a periodicity information about a periodicity which is included in time-series data formed by said every extracted characteristic point; and determining periodicity information about the periodicity in the time-series data which is to be processed, based on the detected periodicity information, and outputting the thus determined periodicity information.

* * * * *

UNITED STATES PATENT AND TRADEMARK OFFICE
CERTIFICATE OF CORRECTION

PATENT NO.   : 5,636,128
DATED        : June 3, 1997
INVENTOR(S)  : SUGIMOTO et al.

It is certified that error appears in the above-identified patent and that said Letters Patent is hereby corrected as shown below:

Col. 7,  line 45, change ""$x_1$" to --"$x_i$--.

Col. 8,  line 11, change "$(d_{i-1},$" to --$(d_i-1,$--.

Signed and Sealed this

Second Day of September, 1997

Attest:

BRUCE LEHMAN

*Attesting Officer*     Commissioner of Patents and Trademarks